United States Patent [19]

Lemire et al.

[11] Patent Number: 5,767,386
[45] Date of Patent: Jun. 16, 1998

[54] EXHAUST GAS SENSOR AND CIRCUIT CONFIGURATION FOR THE EXHAUST GAS SENSOR

[75] Inventors: Bertrand Lemire, Schierling; Willibald Schuerz, Aufhausen, both of Germany

[73] Assignee: Siemens Aktiengesellschaft, Munich, Germany

[21] Appl. No.: 755,457

[22] Filed: Nov. 22, 1996

[30] Foreign Application Priority Data

Nov. 22, 1995 [DE] Germany ............... 195 43 537.0

[51] Int. Cl.⁶ ............... G01N 39/02; G01N 27/46; F02D 41/14
[52] U.S. Cl. ............... 73/23.2; 73/31.06; 73/23.32; 204/406; 204/429; 422/94; 422/108; 123/682; 123/691; 123/703
[58] Field of Search ............... 73/23.2, 31.06, 73/23.32; 204/426–429, 406; 205/784; 422/94, 98, 108; 123/703, 691, 697, 682

[56] References Cited

U.S. PATENT DOCUMENTS

| | | | |
|---|---|---|---|
| 4,029,472 | 6/1977 | Micheli et al. | 23/254 E |
| 4,101,403 | 7/1978 | Kita et al. | 204/195 S |
| 4,132,615 | 1/1979 | Linder et al. | 204/195 S |
| 4,189,355 | 2/1980 | Fujishiro et al. | 204/1 T |
| 4,574,264 | 3/1986 | Takahashi et al. | 338/34 |
| 4,773,376 | 9/1988 | Uchikawa et al. | 123/489 |
| 4,870,938 | 10/1989 | Nakaniwa et al. | 123/489 |
| 4,957,705 | 9/1990 | Uchikawa | 422/94 |
| 5,086,286 | 2/1992 | Yasukawa et al. | 338/34 |
| 5,271,816 | 12/1993 | Tanaka et al. | 204/153.16 |
| 5,335,493 | 8/1994 | Uchida et al. | 60/274 |
| 5,363,091 | 11/1994 | Kotwicki et al. | 340/439 |
| 5,423,973 | 6/1995 | Friese et al. | 204/426 |
| 5,443,711 | 8/1995 | Kojima et al. | 204/429 |
| 5,445,796 | 8/1995 | Mori | 422/98 |
| 5,580,440 | 12/1996 | Ueno et al. | 205/784 |
| 5,635,628 | 6/1997 | Fleischer et al. | 73/31.06 |

FOREIGN PATENT DOCUMENTS

42 28 052  4/1993  Germany.

*Primary Examiner*—Hezron E. Williams
*Assistant Examiner*—J. David Wiggins
*Attorney, Agent, or Firm*—Laurence A. Greenberg; Herbert L. Lerner

[57] ABSTRACT

An exhaust gas sensor has first and second sensor elements. Exhaust gas surroundings of the first sensor element are catalytically activated, so that an oxygen partial pressure which is in equilibrium will always be measured by the first sensor element, regardless of the conversion capability of a catalytic converter. The exhaust gas surroundings of the second sensor element are separate from the exhaust gas surroundings of the first sensor element, so that the exhaust gas surroundings of the second sensor element are not catalytically active. As a function of the conversion capability of the catalytic converter, the second sensor element measures either an equilibrium oxygen partial pressure or a free oxygen partial pressure, which are of different magnitudes. A malfunction of the catalytic converter is detected by comparing measurement signals of the first and second sensor elements.

8 Claims, 4 Drawing Sheets

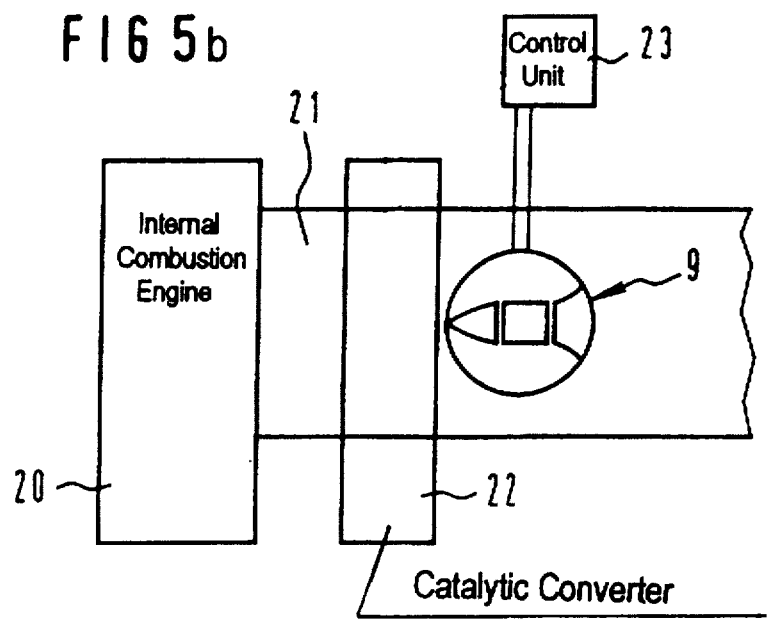

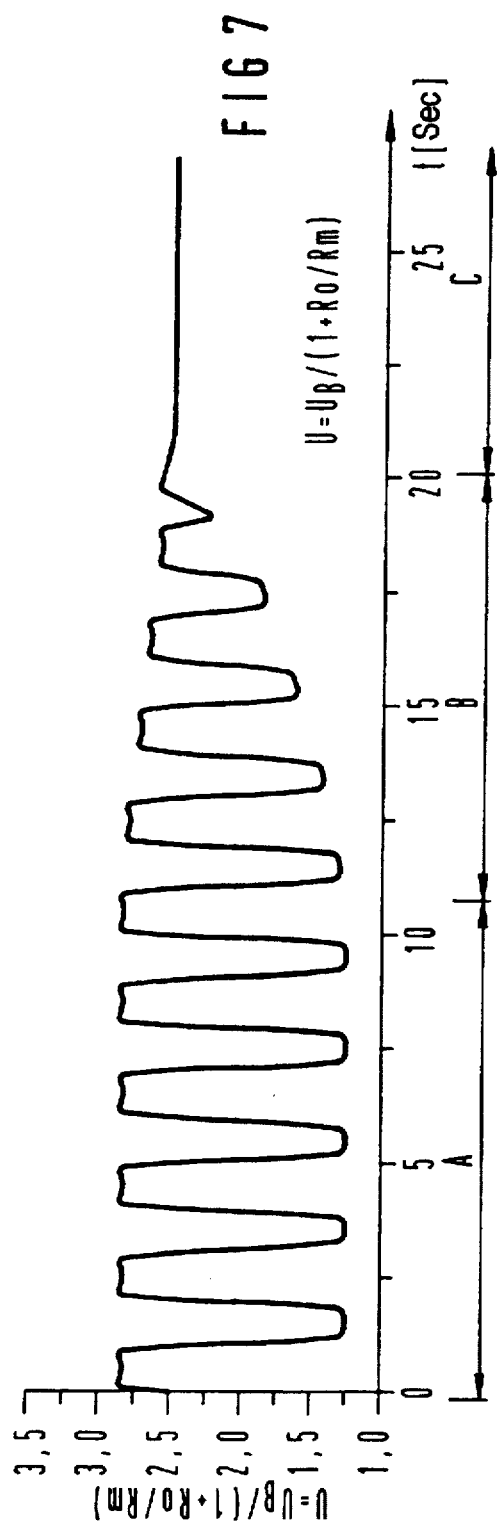
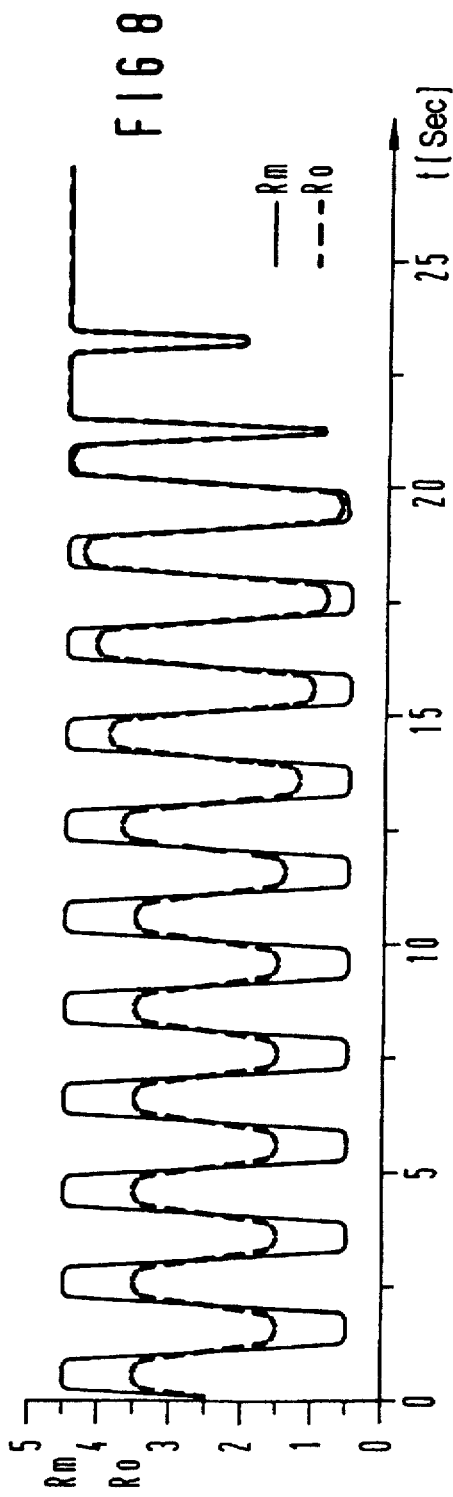

EXHAUST GAS SENSOR AND CIRCUIT CONFIGURATION FOR THE EXHAUST GAS SENSOR

BACKGROUND OF THE INVENTION

FIELD OF THE INVENTION

The invention relates to an exhaust gas sensor having a substrate, first and second sensor elements for measuring an oxygen partial pressure, and a catalytic layer for activating exhaust gas in the surroundings of the first sensor element to a chemical reaction. The invention also relates to a circuit configuration for the exhaust gas sensor.

An exhaust gas sensor for regulating internal combustion engines, which is known from German Published, Non-Prosecuted Patent Application DE 42 28 052 A1, includes a sensor that has two sensor elements disposed side by side on a common substrate. The first sensor element has a catalytic layer which has the effect of establishing an equilibrium oxygen partial pressure in the exhaust gas, given a stoichiometric exhaust gas composition. The equilibrium pressure is measured by the first sensor element.

The second sensor element, which has no catalytic layer, measures the free oxygen partial pressure in the exhaust gas, without a catalytic adjustment of stoichiometric conditions.

A sensor signal which is formed from the signals of the first and second sensor elements, is a measure of the incompleteness of combustion of the engine.

SUMMARY OF THE INVENTION

It is accordingly an object of the invention to provide an exhaust gas sensor and a circuit configuration for the exhaust gas sensor, which overcome the hereinafore-mentioned disadvantages of the heretofore-known devices of this general type and in which the exhaust gas sensor is of simple construction and has improved measurement accuracy.

With the foregoing and other objects in view there is provided, in accordance with the invention, an exhaust gas sensor, comprising a substrate; first and second sensor elements associated with the substrate for measuring an oxygen partial pressure, the sensor elements defining exhaust gas surroundings of the sensor elements; a catalytic layer for activating exhaust gas in the exhaust gas surroundings of the first sensor element to a chemical reaction; and the exhaust gas surroundings of the first sensor element being separated from the exhaust gas surroundings of the second sensor element for preventing the exhaust gas surroundings of the second sensor element from being catalytically activated.

It is especially advantageous to place the first and second sensor elements separately from one another in spatial terms in such a way that the catalytic layer of the first sensor element does not affect the exhaust gas surroundings of the second sensor element. As a result, the accuracy of the exhaust gas sensor is increased.

In accordance with another feature of the invention, the substrate has opposite surfaces, the first sensor element is disposed on one of the surfaces of the substrate, and the second sensor element is disposed on the other of the surfaces of the substrate.

With the objects of the invention in view there is also provided a mounting device having an interior and separate first and second exhaust gas conduits, the exhaust gas sensor being secured in the interior of the mounting device and at least partly surrounded by the mounting device, the first sensor element protruding into the first exhaust gas conduit, and the second sensor element protruding into the second exhaust gas conduit.

In accordance with another feature of the invention, the catalytic layer is applied to a guard tube in the vicinity of the first sensor element.

In accordance with an added feature of the invention, the first and second sensor elements have surfaces, the first and second exhaust gas conduits have surfaces, the surface of the first sensor element is approximately parallel to and merges evenly with the surface of the first exhaust gas conduit, and the surface of the second sensor element is approximately parallel to and merges evenly with the surface of the second exhaust gas conduit.

In accordance with an additional feature of the invention, there is provided a component in the surroundings of the first sensor element, the catalytically active layer being disposed on the component.

In accordance with yet another feature of the invention, the catalytic layer is at least partly applied to the surface of the first exhaust gas conduit, and the catalytic layer is disposed upstream of or at least at the same level as the first sensor element, as seen in flow direction of the exhaust gas.

An especially simple production process for the exhaust gas sensor is attained by providing that the catalytic layer is disposed not on the first sensor element but rather in the vicinity of the first sensor element.

With the objects of the invention in view there is additionally provided an assembly having an internal combustion engine, a catalytic converter, an exhaust gas sensor disposed in or downstream of the catalytic converter and a circuit configuration, the exhaust gas sensor and circuit configuration comprising a substrate; first and second sensor elements associated with the substrate for measuring an oxygen partial pressure, the sensor elements defining exhaust gas surroundings of the sensor elements, the sensor elements being connected in series to a supply voltage for picking up a voltage between the first and second sensor elements for checking a conversion capability of the catalytic converter; a catalytic layer for activating exhaust gas in the exhaust gas surroundings of the first sensor element to a chemical reaction; and the exhaust gas surroundings of the first sensor element being separated from the exhaust gas surroundings of the second sensor element for preventing the exhaust gas surroundings of the second sensor element from being catalytically activated.

Other features which are considered as characteristic for the invention are set forth in the appended claims.

Although the invention is illustrated and described herein as embodied in an exhaust gas sensor and a circuit configuration for the exhaust gas sensor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 5a and 5b are block diagram of two embodiments of a measuring circuit configuration;

FIG. 7 is a graph showing a course of a measurement signal as it proceeds over time; and FIG. 8 is a graph showing a course of resistances of first and second sensor elements as a function of time.

DESCRIPTION OF THE PREFERRED EMBODIMENTS

Figure 1:
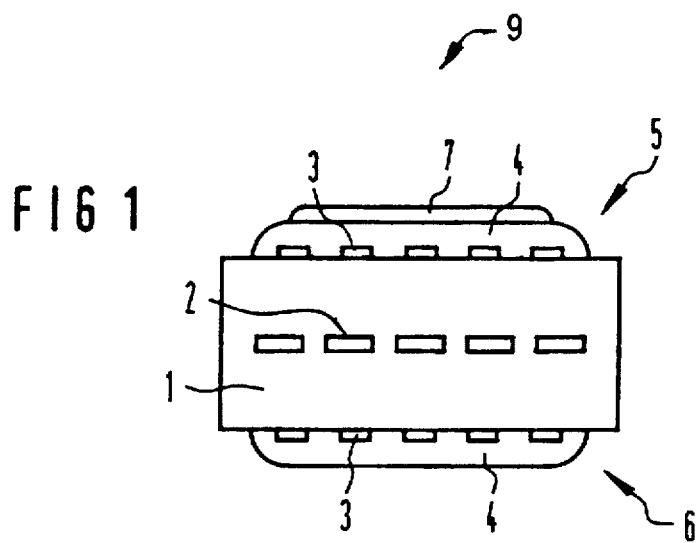
FIG. 1 is a diagrammatic, side-elevational view of an exhaust gas sensor.

Referring now to the figures of the drawings in detail and first, particularly, to FIG. 1 thereof, there is seen an exhaust gas sensor 9 which has a substrate 1 with upper and lower surfaces. Measurement electrodes 3 are each disposed on a respective one of the upper and lower surfaces of the substrate 1 and the measurement electrodes 3 are each covered by a respective metal oxide layer 4. A catalytic layer 7 is additionally applied to the upper surface of the substrate 1, over the metal oxide layer 4. Except for the catalytic layer 7, the exhaust gas sensor 9 is constructed identically on the upper surface and lower surface of the substrate 1.

A heating structure 2 which is incorporated into the substrate 1 is preferably produced from platinum and serves to heat the exhaust gas sensor 9, which is operated at a temperature of from 800° C. to 900° C. In addition, the temperature of the substrate 1 can simultaneously be measured by a resistance measurement through the heating structure 2.

The substrate 1 preferably is formed of aluminum oxide ($Al_2O_3$), the measuring electrode 3 is formed of platinum, and the metal oxide layer 4 is formed of a weakly catalytically active metal oxide, preferably strontium titanate ($SrTiO_3$)

The layer configuration on the upper surface of the substrate 1 represents a first sensor element 5 with the catalytic layer 7, which is formed, for instance, of platinum, palladium or rhodium. An equilibrium oxygen partial pressure is always established on the catalytic layer 7, so that the first sensor element 5, in a measurement downstream of a catalytic converter, always measures an equilibrium oxygen partial pressure regardless of the conversion capability of the catalytic converter.

The layer configuration on the lower surface of the substrate 1 represents a second sensor element 6, which is not catalytically active or is only weakly catalytically active, so that the exhaust gas is not induced to a reaction, or at least is only to a slight extent induced to a reaction, especially oxidation. Thus the exhaust gas in the surroundings of the second sensor element 6 has an oxygen partial pressure which corresponds to the composition of the exhaust gas, and which in a measurement downstream of the catalytic converter depends directly on the conversion capability of the catalytic converter.

The oxygen partial pressure in the surroundings of the metal oxide layer 4 has a direct influence on the conductivity of the metal oxide layer 4. The conductivity $\sigma$ is obtained by the following formula:

$$\sigma(T)=\sigma o \cdot \exp(-E/kT) \cdot f(po), \quad (1)$$

in which $\sigma o$ is a conductivity constant, E is an activation energy, k is Boltzmann's constant, T is the absolute temperature, and f(po) is a function of the oxygen partial pressure (po) in the surroundings of the metal oxide layer 4. Since the metal oxide layers 4 of the first and second sensor elements 5, 6 are of the same material, the conductivity constant so and the activation energy E are of equal magnitude for the conductivity of the metal oxide layers 4 of the first and second sensor elements 5, 6. The first and second sensor elements 5, 6 are disposed at the same spacing from the heating structure 2, and the layout of the first and second sensor elements 5, 6 is identical, so that the temperatures in the metal oxide layers 4 of the first and second sensor elements 5, 6 are also of equal magnitude. The conductivities of the metal oxide layers 4 of the first and second sensor elements thus differ only on the basis of different oxygen partial pressures in the surroundings of the metal layers 4 of the first and second sensor elements 5, 6. Thus the different oxygen partial pressure is measurable through the use of a different conductivity of the first and second sensor elements 5, 6.

Figure 2:
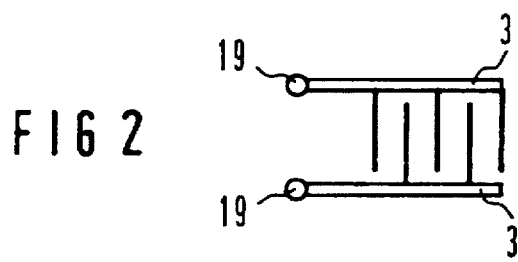
FIG. 2 is a plan view of a measuring electrode.

FIG. 2 shows the structure of the measuring electrode 3 with which the resistance of the metal oxide layer 4 is measured. To that end, a voltage is applied to two terminal points 19 of the measuring electrode 3, the current is measured, and the resistance of the metal oxide layer 4 which is calculated therefrom represents a comparison variable for the oxygen partial pressures in the surroundings of the first and second sensor elements 5, 6.

Figure 3:
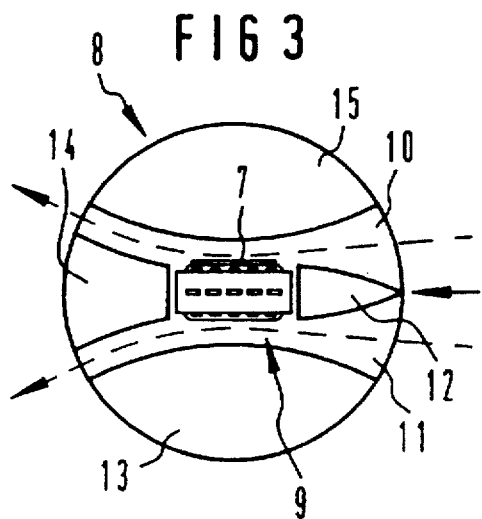
FIG. 3 is a reduced, side-elevational view of a guard tube with an exhaust gas sensor.

A further feature of the invention which is shown in FIG. 3 is based on securing the exhaust gas sensor 9 in a mounting, in particular in a guard tube or mounting device 8. The guard tube 8 is constructed in such a way that the exhaust gas sensor 9 is protected on all sides against mechanical damage. The guard tube 8 is preferably circular in cross section, and the exhaust gas sensor 9 is disposed in the middle of the guard tube 8. The guard tube 8 is installed in an exhaust gas pipe of an internal combustion engine downstream of a catalytic converter or in the catalytic converter. The flow direction of the exhaust gas is represented by an arrow.

In order to ensure that the exhaust gas will reach the first and second sensor elements 5, 6, a first exhaust gas conduit 10 and a second exhaust gas conduit 11 are introduced into the guard tube 8. The conduits carry the exhaust gas arriving from the catalytic converter into the guard tube 8, so that the exhaust gas flows through the first and second sensor elements 5, 6 and then emerges from the guard tube 8 again. An essential effect of the exhaust gas conduits 10, 11 is to separate the exhaust gas surroundings of the first and second sensor elements 5, 6, so that the exhaust gas surroundings of the second sensor element 6 are not affected by the catalytic layer 7 of the first sensor element 5.

The first exhaust gas conduit 10 is constructed in such a way that it tapers in cross section in the flow direction of the exhaust gas toward the first sensor element 5, so that an accelerated exhaust gas flow prevails over the first sensor element 5.

The second exhaust gas conduit 11 is constructed in such a way that it likewise tapers in cross section in the flow direction of the exhaust gas toward the second sensor element 6, so that an accelerated exhaust gas flow likewise prevails over the second sensor element 6.

An advantageous feature of the guard tube 8 is that the exhaust gas sensor 9 is disposed symmetrically to a center line which passes through a center point of the circular cross section of the guard tube 8. The first sensor element 5 and the second sensor element 6 are disposed mirror-symmetrically to the center line. The inlet conduits 10, 11 are likewise oriented mirror-symmetrically to the center line. As viewed in cross section, the first inlet conduit 10 is separated from the second inlet conduit 11 by an inlet wedge 12, which begins at an inlet region of the exhaust gas path and widens toward the exhaust gas sensor 9.

An end of the inlet wedge 12 that borders on the exhaust gas sensor 9 is constructed with the same width as the exhaust gas sensor 9, so that the exhaust gas sensor 9 merges flush with the inlet wedge 12, and the inlet wedge 12 and the sensor elements 5, 6 form a stepless or smooth plane.

In terms of the flow direction of the exhaust gas, a termination piece 14 adjoins the exhaust gas sensor 9 steplessly or smoothly downstream thereof. The termination piece 14 is the same width as the exhaust gas sensor 9. The termination piece 14 and the sensor elements 5, 6 thus form a stepless or smooth surface.

As a result of the above-described geometry of the inlet wedge 12, the exhaust gas sensor 9 and the termination piece 14, a low-resistance flow is created in the first and second exhaust gas conduits 10, 11, since the exhaust gas is not made turbulent in the exhaust gas conduits. In FIG. 3, the exhaust gas sensor 9 is constructed in accordance with FIG. 1.

Figure 4:
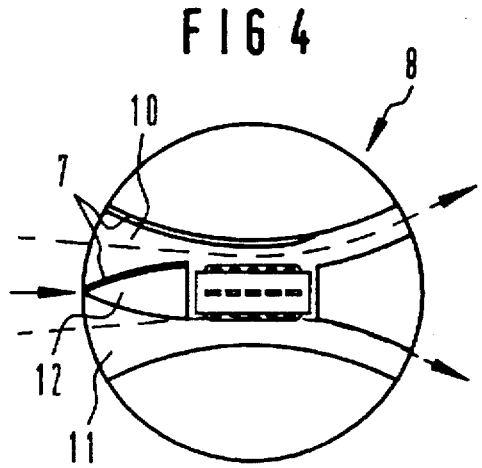
FIG. 4 is a reduced, side-elevational view of a guard tube onto which a catalytic layer is applied.

An advantageous further embodiment of the invention is shown in FIG. 4. The guard tube 8 of FIG. 4 is constructed like the guard tube 8 of FIG. 3 with regard to shape. A difference as compared to FIG. 3 is that the catalytic layer 7 is disposed not on the first sensor element 5 but rather on the guard tube 8 in the vicinity of the first sensor element 5, and in particular in the vicinity of the metal oxide layer 4 of the first sensor element 5. Walls of the first exhaust gas conduit 10, which are disposed upstream of the first sensor element in terms of the direction of exhaust gas flow, represent an advantageous region for the application of the catalytic layer 7. The exhaust gas flow is indicated by an arrow.

FIG. 4 shows a catalytic layer 7 which is applied to a surface, that is to the wall of the first exhaust gas conduit 10. The first exhaust gas conduit is circular in cross section, and the catalytic layer 7 is preferably disposed on an entire inner surface of the first exhaust gas conduit 10 that is located upstream of the first sensor element 5 in terms of the exhaust gas flow direction, or at least at the same level as the first sensor element. The catalytic layer 7 is applied either only to the wall of the first exhaust gas conduit 10 or else it is also partly applied to the first sensor element 5.

If the catalytic layer 7 is applied only to the guard tube 8, then the exhaust gas sensor 9 is made up of a first sensor element 5 and a second sensor element 6 which are identical. That makes the production process for the exhaust gas sensor 9 simpler.

The guard tube 8 is formed of a ceramic, such as aluminum oxide, do which the catalytic layer 7 adheres well. The adhesion is promoted by the greater surface roughness of the ceramic, as compared with the metal oxide 4.

A further advantage is based on the fact that the size of the surface area of the catalytic layer 7 is not limited to the size of the surface area of the first sensor element 5. Thus the structural shape of the exhaust gas sensor 9 can be selected independently of the necessary surface area for the catalytic layer 7, and therefore the exhaust gas sensor 9 can be constructed even smaller.

Figure 5A:
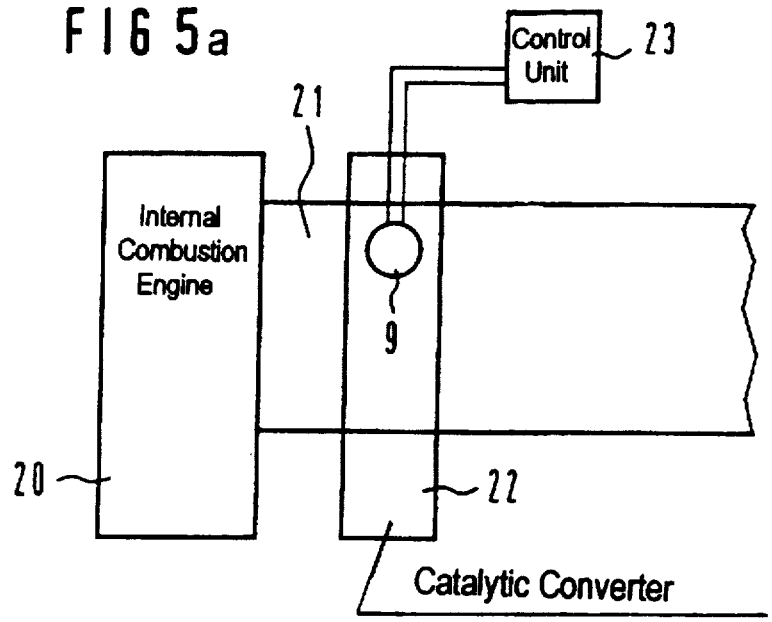

FIGS. 5a and 5b show two measuring configurations each with an internal combustion engine 20, to which an exhaust gas pipe 21 that is guided through a catalytic converter 22 is connected. The exhaust gas sensor 9 is introduced in the catalytic converter or downstream of the catalytic converter 22 and is connected through measuring lines to a control unit 23.

Figure 6:
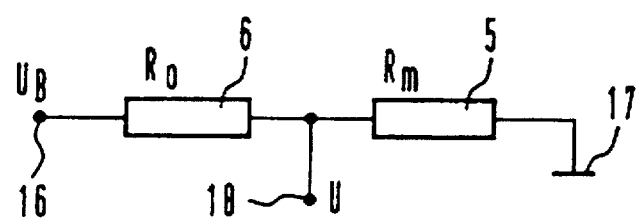
FIG. 6 is a schematic substitute circuit diagram for a circuit configuration.

FIG. 6 shows a substitute circuit diagram for the circuit configuration of FIG. 5. The measurement electrodes 3 of the first and second sensor elements 5, 6 are connected in series to a supply voltage 16. The supply voltage 16 is 5 V and is also indicated by reference symbol $U_B$. A first resistance of the first sensor element 5 is indicated by reference symbol $R_m$ and a second resistance of the second sensor element 6 is indicated by reference symbol $R_O$. An output measuring voltage 18 which is indicated-by reference symbol U is measured between the first and second sensor elements 5, 6. The first sensor element 5 is connected to ground 17. The output measuring voltage U depends on the operating or supply voltage $U_B$ and also exclusively on a ratio between the first and second resistances, $R_m$ to $R_O$:

$$U=U_B/(1+R_O/R_m) \quad (2)$$

The resistance of the metal oxide layer 4 is inversely proportional to the conductivity σ of the metal oxide layer, which is indicated in equation (1). The resistances Ro and Rm of the first and second sensor elements thus depend only on the oxygen partial pressures in the exhaust gas in the surroundings of the first and second sensor elements 5, 6. The effects produced by a temperature change or a mass current change are also compensated for through the use of the selected measuring configuration of the first and second sensor elements 5, 6. In addition, aging of the first and second sensor elements 5, 6 is compensated for, which improves the long-term stability of the output voltage U.

Since the guard tube 8 is made from ceramic, the low thermal conductivity of the ceramic reduces the effect of thermal fluctuations in the exhaust gas on the temperature of the exhaust gas sensor 9. Since only the surfaces of the first and second sensor elements 5, 6 are exposed to the exhaust gas, the necessary heating capacity of the heating structure 2 for operating the exhaust gas sensor 9 is reduced. The symmetrical layout of the exhaust gas sensor 9 and of the first and second exhaust gas conduits 10, 11 assures that the influence of the exhaust gas temperature and the exhaust gas flow on the first and second sensor elements 5, 6 are equal, so that the temperatures of the first and second sensor elements 5, 6 match.

The measurement principle is based on the fact that in the region of the first sensor element 5, because of the catalytic activity of the catalytic layer 7, the exhaust gas is induced to reactions, especially oxidation, and an equilibrium oxygen partial pressure is established, either because the exhaust gas already has the equilibrium oxygen partial pressure due to a high conversion capability of the catalytic converter, or because the catalytically active layer 7 itself produces an equilibrium oxygen partial pressure in the exhaust gas.

Conversely, in the surroundings of the second sensor element 6, an oxygen partial pressure is established that depends on the current exhaust gas composition downstream of the catalytic converter. The characteristic curve of the air number and resistance of the second sensor element 6 is thus identical to the characteristic curve of the air number and resistance of the first sensor element 5 only in the presence of high conversion rates of the catalytic converter. In that case, the resistances $R_O$ and $R_m$ are of the same size, and the measuring signal U is $U_B/2$. If the conversion rate of the catalytic converter drops, then the ratio of $R_O$ to $R_M$ varies to values below 1 under air excess (lean fuel mixture) and to values of greater than one in air deficiency (rich fuel mixture). The amplitude of the measurement voltage signal U of the exhaust gas sensor 9 around the value $U_B/2$ in λ-regulated operation is directly a measure of the conversion rate of the catalytic converter. The λ-regulated operation is the operating state in which the value of the ratio of air to fuel (λ) in the fuel mixture is adjusted alternatingly to be greater than or less than 1.

FIG. 7 shows a course over time of the measuring voltage U as a function of time t for a properly functioning catalytic converter with a high conversion rate for an internal combustion engine operating in the λ-regulated mode. In a first operating state A, which corresponds to a cold catalytic converter, the amplitudes of the measuring voltage U are equal, and the frequency of the measuring voltage U is constant.

In a second operating state B, in which the conversion rate of the catalytic converter increases, the amplitudes of the measuring signal U are smaller with increasing time, but the frequency remains constant.

In a third operating state C, in which the conversion rate of the catalytic converter reaches a maximum, the measuring signal U changes over to a direct voltage.

FIG. 8 shows the course of the first resistance $R_m$ and the second resistance $R_0$, corresponding to the operating states of FIG. 7. It can be seen clearly from FIG. 8 that with an increasing rise in the conversion rate of the catalytic converter, the second resistance $R_0$ increases, since the second resistance $R_0$ is proportional to $1/\sigma$, where $\sigma$ designates the conductivity which is proportional to the oxygen partial pressure. At a high conversion rate of the catalytic converter 22, an equilibrium oxygen partial pressure always prevails in the exhaust gas, in accordance with the existing stoichiometric conditions, so that the first and second sensor elements 5, 6 measure the same oxygen partial pressure.

However, if the catalytic converter 22 has only slight or no conversion capability, then a free oxygen partial pressure prevails in the exhaust gas and this is measured by the second sensor element 6, while conversely the first sensor element 5, because of its own catalytic action, measures an equilibrium oxygen partial pressure, so that the first and second resistances have different resistance values, and it can thus be concluded that the conversion capability of the catalytic converter 22 is slight.

We claim:

1. An exhaust gas sensor assembly, comprising:

an exhaust gas sensor including a substrate, first and second sensor elements associated with said substrate for measuring an oxygen partial pressure, said sensor elements defining exhaust gas surroundings of said sensor elements, a catalytic layer for activating exhaust gas in the exhaust gas surroundings of said first sensor element to a chemical reaction, and the exhaust gas surroundings of said first sensor element being separated from the exhaust gas surroundings of said second sensor element for preventing the exhaust gas surroundings of said second sensor element from being catalytically activated; and a mounting device having an interior and separate first and second exhaust gas conduits, said exhaust gas sensor being secured in said interior of said mounting device and at least partly surrounded by said mounting device;

said first sensor element protruding into said first exhaust gas conduit, and said second sensor element protruding into said second exhaust gas conduit.

2. The exhaust gas sensor according to claim 1, wherein said substrate has opposite surfaces, said first sensor element is disposed on one of said surfaces of said substrate, and said second sensor element is disposed on the other of said surfaces of said substrate.

3. The exhaust gas sensor assembly according to claim 1, wherein:

said first and second sensor elements have surfaces;

said first and second exhaust gas conduits have surfaces;

said surface of said first sensor element is approximately parallel to and merges evenly with said surface of said first exhaust gas conduit; and said surface of said second sensor element is approximately parallel to and merges evenly with said surface of said second exhaust gas conduit.

4. The exhaust gas sensor according to claim 1, including a component in the surroundings of said first sensor element, said catalytically active layer being disposed on said component.

5. The exhaust gas sensor assembly according to claim 1, including a component in the surroundings of said first sensor element, said catalytically active layer being disposed on said component.

6. The exhaust gas sensor assembly according to claim 3, wherein:

said catalytic layer is at least partly applied to said surface of said first exhaust gas conduit; and said catalytic layer is disposed at least at the same level as said first sensor element, as seen in flow direction of the exhaust gas.

7. The exhaust gas sensor assembly according to claim 6, wherein said catalytic layer is disposed upstream of said first sensor element.

8. The exhaust gas sensor assembly according to claim 3, wherein said exhaust gas sensor is disposed in a catalytic converter.

* * * * *